US011567398B2

(12) United States Patent
Peel et al.

(10) Patent No.: US 11,567,398 B2
(45) Date of Patent: Jan. 31, 2023

(54) CAMERA MOUNT SYSTEM

(71) Applicant: Tactacam LLC, Caledonia, MN (US)

(72) Inventors: Jeffrey B. Peel, Decorah, IA (US);
Garrison J. Peel, Caledonia, MN (US);
Benjamin B. Stern, Holmen, WI (US)

(73) Assignee: TACTACAM LLC, Caledonia, MN (US)

( * ) Notice: Subject to any disclaimer, the term of this patent is extended or adjusted under 35 U.S.C. 154(b) by 0 days.

(21) Appl. No.: 16/997,291

(22) Filed: Aug. 19, 2020

(65) Prior Publication Data
US 2021/0109435 A1 Apr. 15, 2021

Related U.S. Application Data

(63) Continuation of application No. 16/533,148, filed on Aug. 6, 2019, now Pat. No. 10,754,240.

(60) Provisional application No. 62/790,453, filed on Jan. 9, 2019, provisional application No. 62/715,031, filed on Aug. 6, 2018.

(51) Int. Cl.
*G03B 29/00* (2021.01)
*F41G 11/00* (2006.01)
*F41C 27/00* (2006.01)

(52) U.S. Cl.
CPC .............. *G03B 29/00* (2013.01); *F41C 27/00* (2013.01); *F41G 11/001* (2013.01)

(58) Field of Classification Search
None
See application file for complete search history.

(56) References Cited

U.S. PATENT DOCUMENTS

| 3,911,451 A | 10/1975 | Vockenhuber |
| 4,576,432 A | 3/1986 | Ruger |
| 4,621,888 A | 11/1986 | Crossland |

(Continued)

FOREIGN PATENT DOCUMENTS

| EP | 3031494 | 6/2016 |
| WO | 2013012331 | 1/2013 |

(Continued)

OTHER PUBLICATIONS

PCT, Notification of Transmittal of the International Search Report and the Written Opinion of the International Searching Authority, in application No. PCT/US2019/045247, dated Oct. 17, 2019 (8 pages).
Side-Shot Scope Cam, https://www.side-shot.com/, home page [web page and screen shots retrieved from the internet on Aug. 6, 2019], (8 pages).
Side-Shot Scope Cam, https://www.side-shot.com/online [web page and screen shots retrieved from the internet on Aug. 6, 2019], (2 pages).

(Continued)

*Primary Examiner* — Reginald S Tillman, Jr.
(74) *Attorney, Agent, or Firm* — McAndrews, Held & Malloy, Ltd.

(57) ABSTRACT

Systems, apparatuses, and methods are described which provide a camera mount system. The camera mount system can include, for example, a first optical element and a second optical element. Incoming light from a scope on a weapon, for example, is partially transmitted and partially reflected by the first optical element. The partially transmitted light passes through an eyepiece to a viewer (e.g., a shooter). The partially reflected light is reflected by the second optical element and is recorded by a recording device (e.g., a camera, a video recorder, an image sensor, etc.). The viewer has direct access to the scope optics, a spotting scope, or (Continued)

binoculars, for example, and the camera and the viewer have access to the same view.

16 Claims, 13 Drawing Sheets

(56) References Cited

U.S. PATENT DOCUMENTS

| | | | |
|---|---|---|---|
| 5,020,262 | A | 6/1991 | Pena |
| H1891 | H | 10/2000 | McClenahan |
| 6,539,661 | B2 | 4/2003 | Hope |
| 6,604,316 | B1 | 8/2003 | Custer |
| 2005/0252063 | A1 | 11/2005 | Flannigan |
| 2010/0288934 | A1 | 11/2010 | Keppel |
| 2013/0165731 | A1 | 6/2013 | Cernica |
| 2013/0185985 | A1 | 7/2013 | Ballard |
| 2013/0333266 | A1 | 12/2013 | Gose |
| 2014/0350325 | A1 | 11/2014 | Van Appeldoorn |
| 2016/0061567 | A1 | 3/2016 | Regan |
| 2019/0376764 | A1* | 12/2019 | Hammond ............... F41G 1/38 |

FOREIGN PATENT DOCUMENTS

| | | |
|---|---|---|
| WO | 2014087289 | 6/2014 |
| WO | 2016093942 | 6/2016 |

OTHER PUBLICATIONS

Video Your Hunt, Homepage, iScope Optics, https://iscope.com [retrieved from the internet on Aug. 6, 2019], (7 pages).

Phone Skope, How Phone Skope Works, https://www.phoneskope.com [retrieved from the internet on Aug. 6, 2019], (4 pages).

MAK Group: Kilic Feintechnik GmbH—MAK C.E.T.—MAK Turkey, Optics, https://www.mak.ag/en/Optics [retrieved from the internet on Aug. 6, 2019], (2 pages).

Notification of Transmittal of The International Search Report and The Written Opinion of the International Searching Authority, or the Declaration, dated Apr. 29, 2021, International Application No. PCT/IB2020/001025, International Filing Date Dec. 3, 2020 for Applicant Nu-Rise LDA.

Notification Concerning Transmittal of International Preliminary Report on Patentability (Chapter 1 of the Patent Cooperation Treaty), dated Feb. 18, 2021 for International Application No. PCT/US2019/045247, International Filing Date Aug. 6, 2019, Applicant Tactacam LLC.

* cited by examiner

CAMERA MOUNT SYSTEM

RELATED APPLICATIONS/INCORPORATION BY REFERENCE

The present application is a continuation of U.S. application Ser. No. 16/533,148 filed Aug. 6, 2019, which claims the benefit from and claims priority to U.S. Application No. 62/790,453, filed Jan. 9, 2019, and U.S. Application No. 62/715,031, filed Aug. 6, 2018. The above-identified applications are hereby incorporated herein by reference in their entirety.

BACKGROUND

Recording distant video or images through a scope can suffer from a multitude of difficulties.

For example, a smartphone can be secured behind a scope on a rifle. This can be a rather bulky, off-center configuration in which the shooter no longer directly looks through the optics of the scope. Instead of directly looking through the scope, the shooter must adjust to a different positioning (e.g., the off-center positioning since the smartphone camera is located in a corner of the smartphone housing) of the smartphone and the height and width of the display of the smartphone. Typically, the human eye has a hard time focusing on objects that are approximately 3 to 4 inches away, which is the distance of the focused visual cone from the scope and is the normal distance of the shooter's eye from the scope on a weapon. The smartphone configuration alters the shooter's natural position behind the scope since the viewer must focus on the off-center display of the smartphone. This can cause inaccurate and/or inconsistent shots. Further, to locate and/or track a moving target, the shooter must repeatedly look from up close (e.g., approximately 3 to 4 inches away where the display of the smart phone is located) to far away (e.g., down range where the target is located) and back. Not only does this cause eye strain for the shooter, but also impedes the shooter's ability to locate and/or track the moving target. Finally, the smartphone is difficult to optically align and moves out of optical alignment especially when shooting a high recoil rifle.

Some scopes are built with video cameras that employ a display at the back of the scope to display a video image back to the shooter. The shooter is unable to directly use the optic of the scope and instead must rely on the display at the back of the scope. Such scope displays are stressful for eyes focusing on such as a close display, which can make it difficult for the shooter to locate a target (e.g., a moving target). In particular, when the display is located in the scope, the shooter's eyes dilate to adjust to the artificial light of the internal display. When the shooter looks past the scope to locate a target, the shooter's eyes must adjust its focus for the new distance and constrict to accommodate the change in lighting conditions (e.g., from artificial interior light to natural outdoor light). These repeated eye adjustments can be the cause of stress and strain on the eye. Further, since the scope is electronic, the scope cannot be used if the battery runs out of energy.

Finally, standalone cameras (e.g., a point-and-shoot camera) can be mounted on a rifle. However, such configurations are unwieldy. Moreover, the alignment between the camera and the aiming point of the rifle can be inconsistent for the shooter. In addition, the camera does not provide the shooter's view (e.g., a first person shooter's view), but instead provides a view from a different angle and not the view through the scope.

Further limitations and disadvantages of conventional and traditional approaches will become apparent to one of skill in the art, through comparison of such systems with the present disclosure as set forth in the remainder of the present application with reference to the drawings.

BRIEF SUMMARY

Systems and methods for providing a camera mount system substantially as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Figure 1:
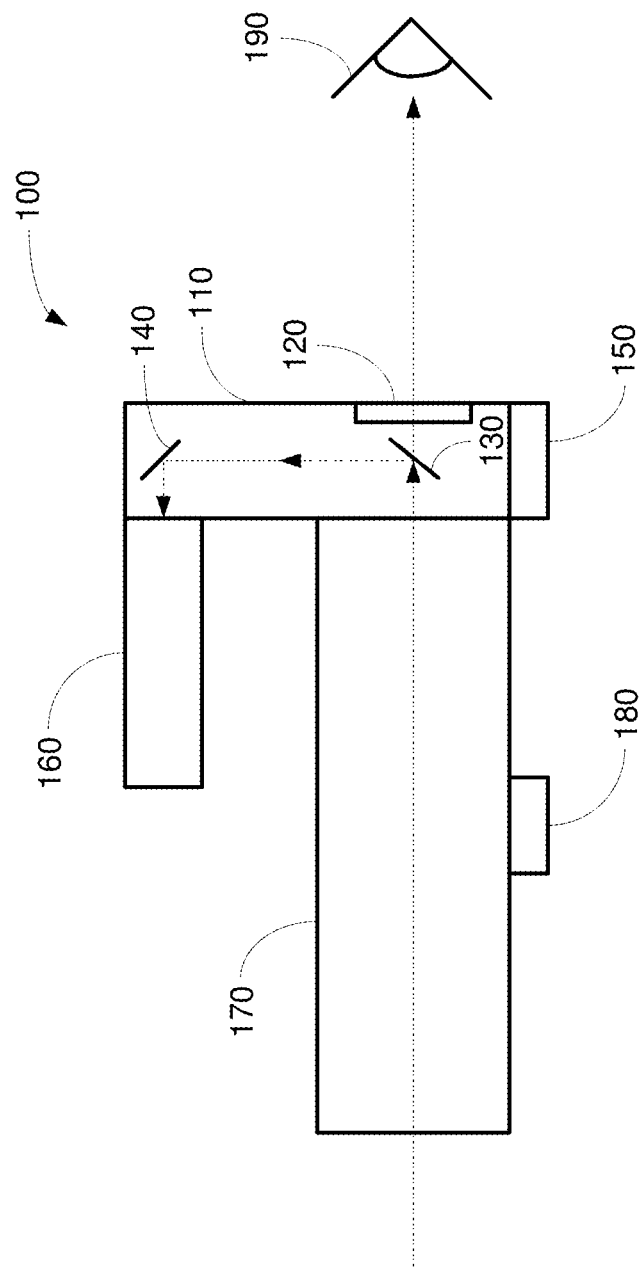
FIG. 1 shows an exemplary camera mount system according to an embodiment of the present disclosure.

As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g." and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Some embodiments according to the present disclosure relate to systems, apparatuses, and methods that provide a camera mount system.

Some embodiments according to the present disclosure provide a camera mount system that includes, for example, a film-through-scope mount that can be attached to or integrated with a scope that is secured to a weapon such as rifle, for example.

Some embodiments according to the present disclosure provide that the camera mount system is positioned behind a scope such that a user can look through the optics of the scope at the same time as a camera is recording the same view through the optics of the scope. The camera can include, for example, one or more of the following: a recording device, a video recorder, an image recorder, one or more sensors, one or more sensor arrays, etc., and can be attached to and/or incorporated into the camera mount system. In some embodiments, via the camera mount system, the camera receives the same view through the scope as seen by the user. The camera and the user both share the optic of the scope. Some embodiments provide that no digital screen is necessary for the user to see through the scope. Instead, the user looks through the optic of the scope via an eyepiece of the camera mount system.

Some embodiments according to the present disclosure provide that the camera mount system includes a plurality of mirrors including, for example, at least one mirror that reflects and transmits light in different directions. In some embodiments, the plurality of mirrors includes a beam splitter. The light that is transmitted through the mirror travels to the user's eye. The light that is reflected travels to the camera (e.g., recording device, video recorder, image recorder, one or more sensors, one or more sensor arrays, etc.). In some embodiments in which the light comes through the optics of a scope, the user can record images or video while also looking through the actual optics of the scope. Further, the camera and the user both access the same view at the same angle without any parallax. This can result in less eye strain for the user and greater ease in target location and tracking.

Some embodiments according to the present disclosure provide that, although the camera and/or camera mount system are battery operated, the user can still use the scope, via the camera mount system, even if the camera and/or camera mount system run out of energy (e.g., battery charge) and/or are not powered.

FIG. 1 shows an exemplary camera mount system according to an embodiment of the present disclosure. Referring to FIG. 1, a camera mount system 100 includes, for example, a housing 110, an eyepiece 120, a first mirror 130, and a second mirror 140. The camera mount system 100 can also have an optional mount 150. The first mirror 130 is structured to reflect and transmit light (e.g., images). In some embodiments, the first mirror 130 includes, for example, one or more of the following: an optical device, an optical element, a reflecting material, a transmissive material, an anti-reflective coating, an optical beam splitter (e.g., an optical beam splitter prism, a device or structure or element that transmits and reflects light in different directions, etc.), etc. The second mirror 140 is structured to at least reflect light. The first mirror 130 and the second mirror 140 are optically aligned to work together. The mount 150 is configured for securing and/or positioning the camera mount system 100. In some embodiments, the mount 150 includes a flip-to-side mount that is used on weapons such as rifles, hand guns, bows, etc.

Referring to FIG. 1, a camera 160 is secured to the housing 110 of the camera mount system 100 and optically aligned with the second mirror 140. In some embodiments, the camera 160 and the camera mount system 100 are integrated into a single unit. In some embodiments, the camera 160 is removably attached and/or secured to the camera mount system 100. The camera 160 can include, for example, a camera, a recorder, a video recorder, an image recorder, one or more sensors, one or more camera sensors, etc. A scope 170 is positioned in front of or is part of the camera mount system 100. In some embodiments, the scope 170 and the camera mount system 100 are integrated into a single unit. In some embodiments, the scope 170 is positioned in front of the camera mount system 100 and removably secured and/or attached to the camera mount system 100. In some embodiments, the mount 180 includes a flip-to-side mount for the scope and/or the camera mount system 100. The scope 170 includes, for example, a mount 180 and optical elements (not shown). In some embodiments, the scope 170 provides magnification, focus, and field-of-view adjustment capabilities.

In some embodiments, the scope 170 is mounted on a weapon (or other platform) via its mount 180, which can allow adjustments for changing the position (e.g., elevation, windage, etc.) of the scope 170. The camera mount system 100 is mounted on the scope 170 and/or on the weapon (or other platform) so that the eyepiece 120 of the camera mount system 100 optically aligns with the optical elements of the scope 170. In some embodiments, the mount 150 of the camera mount system 100 is provided to allow adjustments for changing the position (e.g., elevation, windage, etc.) of the camera mount system 100 and/or elements (e.g., optical elements, mirrors, etc.) in the camera mount system 100. In some embodiments, the mount 150 is optional, and the housing 110 is removably attached to the scope 170.

In some embodiments, the mount 150 of the camera mount system 100 includes a flip-to-side mount so that the camera 160 and the housing 110 of the camera mount system 100 can be flipped to the side giving the user direct access to the scope 170 with no housing 110 therebetween. In some embodiments, one or more flip-to-side mounts 180 and/or 150 can be used to flip one or more of the camera 160, the housing 110, and/or the scope 170 to the side.

Some embodiments provide that one or both of the scope 170 and the camera 160 can be attached to the housing 110 of the camera mount system 100. The scope 170 and/or the camera 160 can be attached to the housing 110 by any number of ways including one or more of the following: a collet system; tightened collars (e.g., screw-tightened collars); cam-lever tightened collars and/or systems; sleeves (e.g., eye-piece sleeves); screws (e.g., nylon-tipped set screws and other types of screws); fasteners; straps (e.g., Velcro straps, hook-and-loop fastener straps, rubber straps, etc.); etc.

In operation according to some embodiments, light such as, for example, light forming an image of a target that is in the distance, for example, enters the scope 170 and is focused and/or magnified by the scope 170 before entering the camera mount system 100. In some embodiments, the target can be approximately 200 to approximately 600 yards away, but the target can also be closer or farther away than that range. The scope 170 can also be employed to change the field of view. The first mirror 130 allows the image to be reflected to the second mirror 140 along a first optical path.

In addition, the first mirror 130 allows the image to be passed through or transmitted along a second different optical path to the eyepiece 120 of the camera mount system 100. In some embodiments, the first optical path may or may not be substantially perpendicular to the second optical path. In some embodiments, a first portion of the light of the image is reflected along the first optical path, and a second portion of the light of the image is transmitted along the second different optical path. In some embodiments, the image propagating along the first optical path is the same as the image propagating along the second optical path. In some embodiments, the image propagating along the first optical path and the image propagating along the second optical path have the same or different light intensities, same or different amplitudes, same or different polarizations, and/or same or different orientation. In some embodiments, additional optical elements (e.g., mirrors, lenses, beam splitters, etc.) can be added to effect changes in light intensities, amplitudes, polarizations, orientations, magnification, focus, etc. and/or to add create and/or combine additional optical paths.

The user sees the image traveling along the second optical path through the eyepiece 120 of the camera mount system 100. Thus, the user is using the optics of the scope 170 without interference from electronic displays (e.g., electronic screens) according to some embodiments.

The image received by the second mirror 140 is reflected and/or redirected to the camera 160 which records and/or re-transmits the received image (e.g., which can be part of multiple images, video, etc.). In some embodiments, the image is reflected by the second mirror 140 in a direction that is different (e.g., substantially opposite, at an angle, at substantially 90°, etc.) with respect to the direction defined by the image transmission direction through the first mirror 130 to the eye 190 of the user. In some embodiments, the image is reflected by the second mirror 140 in a direction that is substantially opposite to the direction of light propagation through the scope 170. In some embodiments, the second mirror 140 can be replaced with the camera 160. In some embodiments, the scope 170 can be integrated with the camera mount system 100 and the camera 160. For example, the scope 170 can house the first mirror 130 (e.g., the beam splitter) and/or one or more camera sensors which receive reflected light from the first mirror 130. Light passing through the first mirror 130 can go to the eye 190 of the user via an eyepiece of the scope 170, for example.

In some embodiments, the image received by the camera 160 has already been magnified and/or focused and/or the field of view has already been set by the scope 170 and/or the camera mount system 100. Thus, in some embodiments, the camera 160 can be a simplified, stream-lined, lightweight camera or other type of recording device. In some embodiments, the camera 160 might or might not have the optical elements (e.g., large lenses) used for magnifying, focusing, and/or changing the field of view. In some embodiments, the magnification and/or focusing and/or adjustment of the field of view occurs at the scope 170. In some embodiments, the magnification and/or focusing and/or adjustment of the field of view occurs at one or both of the scope 170 and the camera mount system 100.

In some embodiments, the camera mount system 100 provides precision optical alignment between the scope 170, the mirrors 130, 140, and the camera 160. The camera mount system 100 provides adjustments so that, for example, the camera 160 and the scope 170 are concentric and the optical axes are aligned. As will be described further below, spacers allow the housing 110 of the camera mount system 100 to be placed on the scope 170 with concentricity maintained via spacer adjustments. In addition, the housing 110 provides other adjustment mechanisms 142 (e.g., adjustment screws) to fine tune the concentric alignment according to some embodiments. In some embodiments, the adjustment mechanisms 142 allow the second mirror 140 in front of the camera 160 to be aligned with respect to the first mirror 130 (e.g., the beam splitter).

Figure 13:
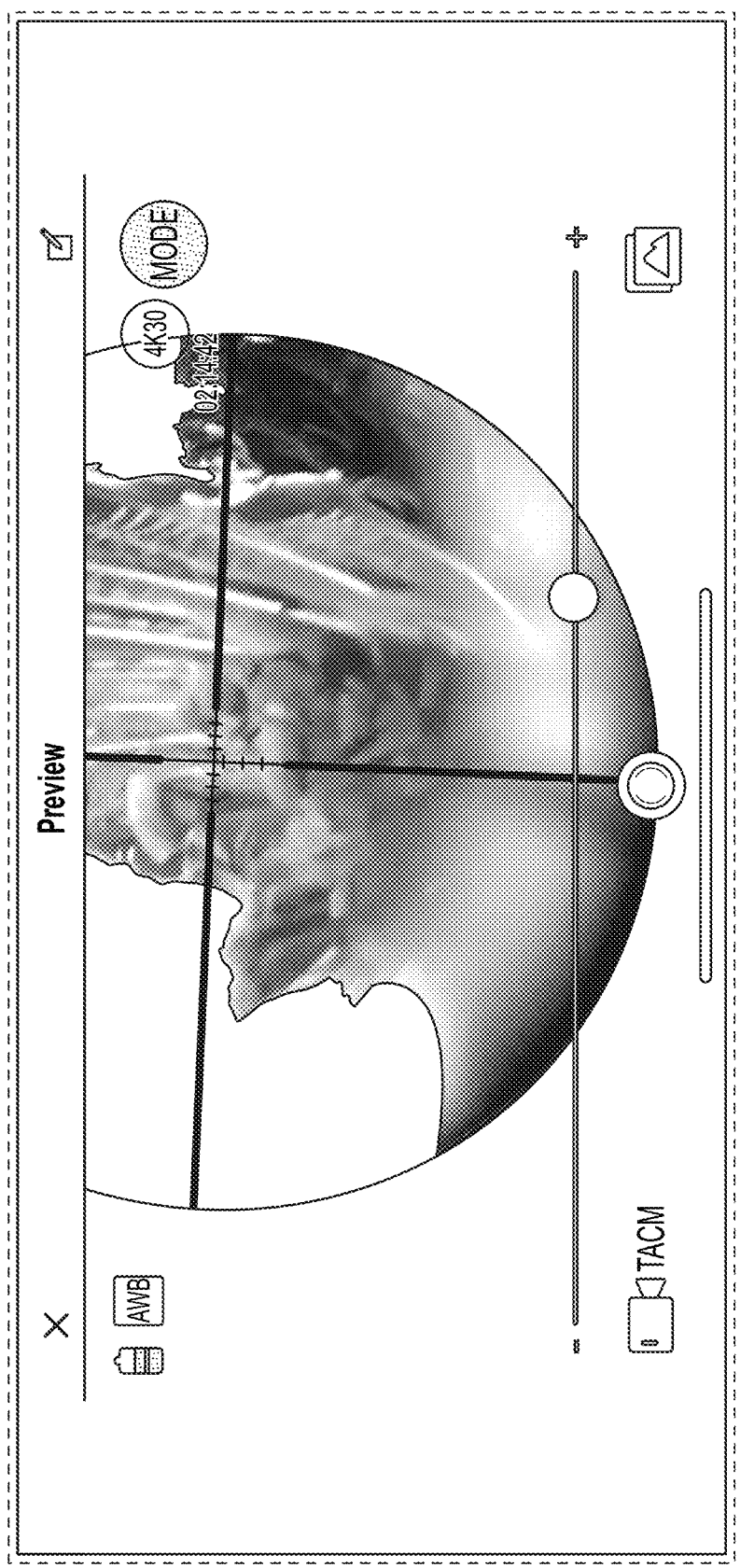
FIG. 13 shows an alignment in progress according to an embodiment of the camera mount system of the present disclosure.

In some embodiments, the camera mount system 100 can provide high precision alignment, thereby enabling the camera mount system 100 to effectively record images and/or video through the scope 170. FIG. 13 shows an alignment in progress according to some embodiments and demonstrates that even slight misalignments can create big issues. Accordingly, in some embodiments, a large monitor and high magnification is used to precisely align, for example, the second mirror 140 in front of the camera 160 and the first mirror 130 (e.g., the beam splitter) and to create precisely centered video.

In some embodiments, the camera mount system 100 with the spacers integrate seamlessly with the scope 170, thereby allowing the user full use of the user optics and, if applicable, proper function of the weapon. The camera mount system 100 is also robust unlike other systems (e.g., systems based on mounting a smartphone) which do not fit well together and/or are not ergonomic. Those other systems are difficult to align and often move out of alignment, for example, when shooting the weapon. In addition, those other systems are disadvantageous in that eye relief is greatly reduced or completely sacrificed. Some embodiments of the camera mount system 100 overcome one or more of these issues with respect to the other systems.

In some embodiments in which one or both of the camera 160 and the camera mount system 100 are battery operated, the user can still look through the eyepiece 120 of the camera mount system 100 even if one or both of the camera 160 and the camera mount system 100 are no longer powered. Further, the user can also employ the functionality of the mount 150 if the mount 150 includes a flip-to-side mount and flip the housing 110 of the camera mount system 100 and the attached camera 160 to the side, thereby giving the user access to the scope 170 without the camera mount system 100 therebetween.

In some embodiments, one or both of the camera 160 and the camera mount system 100 provide a display that can be used to display images and/or video captured and/or live-streamed by the camera 160. The display can also show what the camera 160 and/or the scope 170 is viewing. In some embodiments, one or both of the camera 160 and the camera mount system 100 can include one or more wireless transceivers and/or antennas that provide wireless communications (e.g., WiFi communications, Bluetooth communications, cellular communications, IEEE 802.11 communications, wireless local area network communications, wide area network communications, wireless network communications, etc.) and/or wired communications so that images and/or video captured and/or live-streamed by the camera 160 can be shared with other communication devices that might also have respective displays on which to view images and/or video captured or live-streamed by the camera 160. Similarly, one or both of the camera 160 and the camera mount system 100 can also receive, re-transmit, and/or display images and/or video captured and/or live-streamed by other devices.

In some embodiments, the scope 170 includes a spotting scope or other type of scope or viewer to which the camera mount system 100 is attached. In some embodiments, the camera mount system 100 can adapt to any optic, for example, even an optic with an approximately 0 millimeter or inches to approximately 0.5 millimeter or inches eye relief, for example. In some embodiments, the camera mount system 100 can adapt to an optic with other eye relief distances and/or ranges. In some embodiments, the camera 160 with a display can be mounted to the spotting scope 170, for example, and the display can show images and/or video capture or live-streamed by the camera 160. The display can show, for example, the view of whatever the spotting scope is pointed at. The display can be part of the spotting scope 170, the camera 170, the camera mount system 100, and/or another device. Multiple viewers can then watch the display. In addition, the camera 160, the spotting scope 170, and/or the camera mount system 100 can provide wireless and/or wired communications to other devices with displays (e.g., smartphones, laptops, wearable displays, screens, computers, monitors, etc.) so that others may watch using their respective displays and/or communication devices.

In some embodiments, the camera 160 or camera sensors can be built into the scope 170. In some embodiments, the camera 160 or camera sensors and/or at least some portions and/or elements of the camera mount system 100 are integrated into the scope 170. By repositioning the beam splitter, the camera 160 or camera sensors can record the crosshairs along with the full magnification of the scope 170. In some embodiments, the full magnification and/or crosshairs can be incorporated into any high precision alignment process (e.g., the alignment process of one or more of the scope 170, the camera mount system 100, and the camera 160). In some embodiments, the beam splitter 130 can have transmissivity of between approximately 30% to approximately 70%. In some embodiments, the beam splitter 130 can have transmissivity smaller than approximately 30% and/or larger than approximately 70%. The transmissivity can be fixed or adjustable. In some embodiments, the transmissivity can be changed to adjust the amount of light going to the eye and/or camera depending on the light gathering capability of the optics and/or the ambient conditions. In some embodiments, the camera sensor size corresponds to the lens size and the size of the required space on the scope 170. In some embodiments, the angle of the incidence onto the beam splitter 130 or other optical elements is approximately 45°. In some embodiments, the angle of incidence onto the beam splitter and/or other optical elements is fixed or adjustable from approximately 45° or another angle to some other angle. For example, by customizing the beam splitter using compounding angles such as by changing the angle away from approximately 45°, a much thinner beam splitter can be employed and eye clearance distance can be gained. Further, the other optical elements (e.g., lenses, mirrors, etc.) of the scope 170 can be used to increase eye relief. In some embodiments, optical elements (e.g., lenses, mirrors, etc.) of the scope 170 and the camera sensor, for example, can be on an adjustable track for improved compatibility at short eye reliefs. This configuration enables the distance to be adjusted from the camera or camera sensors to the scope according to the eye relief of the scope.

Figure 2:
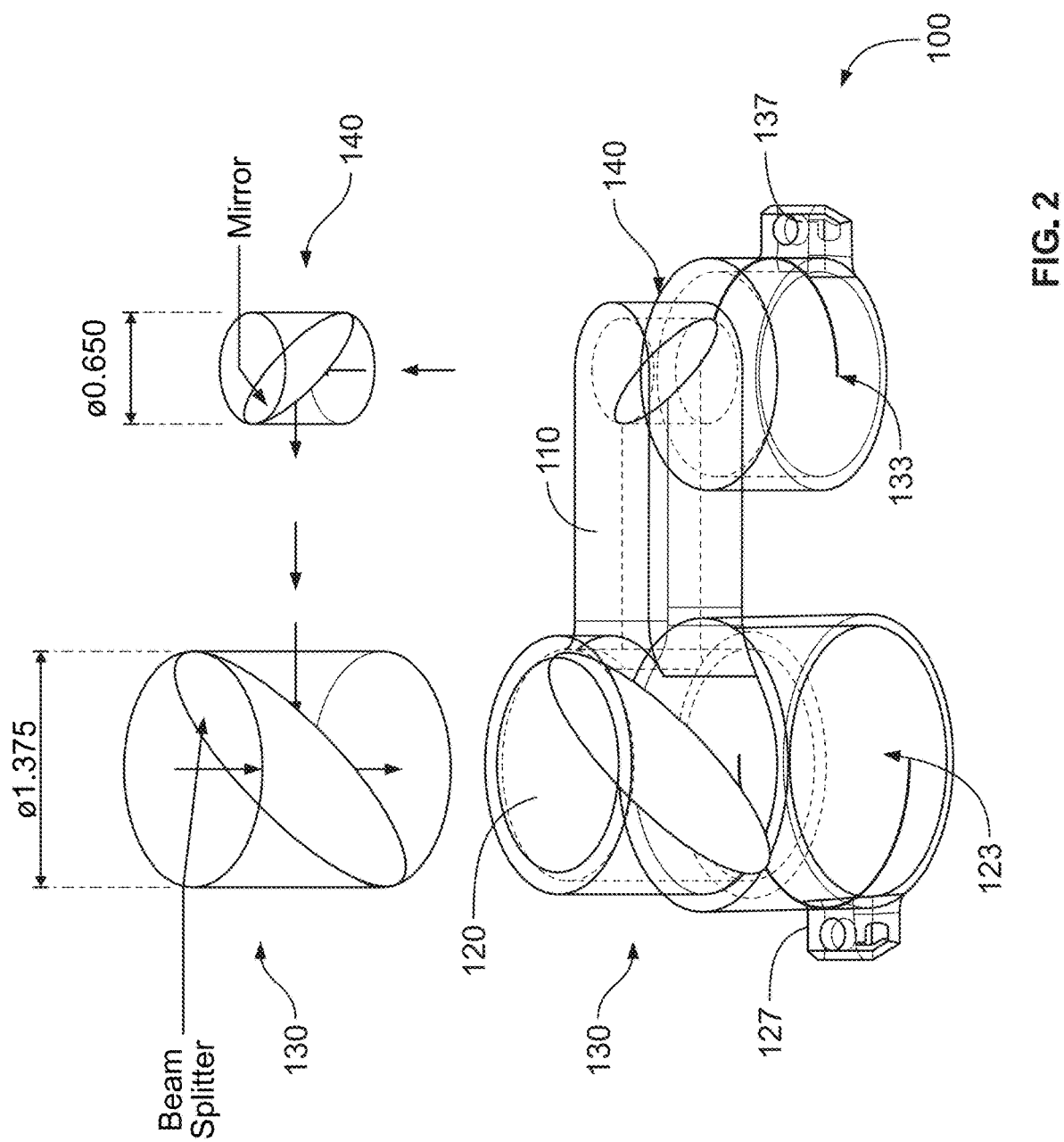
FIG. 2 shows an exemplary camera mount system according to an embodiment of the present disclosure.

FIG. 2 shows an exemplary embodiment of the optical system in the camera mount system according to the present disclosure. Referring to FIG. 2, the first mirror 130 is shown as a beam splitter. The second mirror 140 is shown as a mirror. In some embodiments, the beam splitter 130 can have transmissivity of between approximately 30% to approximately 70%. In some embodiments, the beam splitter 130 can have transmissivity smaller than approximately 30% and/or larger than approximately 70%. The transmis-sivity can be fixed or adjustable. In some embodiments, the transmissivity can be changed to adjust the amount of light going to the eye and/or camera depending on the light gathering capability of the optics and/or the ambient conditions. In some embodiments, the first mirror 130 or another mirror can have a coating (e.g., an anti-reflective coating) that prevents or reduces extraneous light (e.g., ambient light entering the housing 110 via the eyepiece 120) from reaching the camera 160 and/or a camera sensor. The housing 110 can have a flat black color inside to further reduce extraneous light reflectivity.

Figure 9:
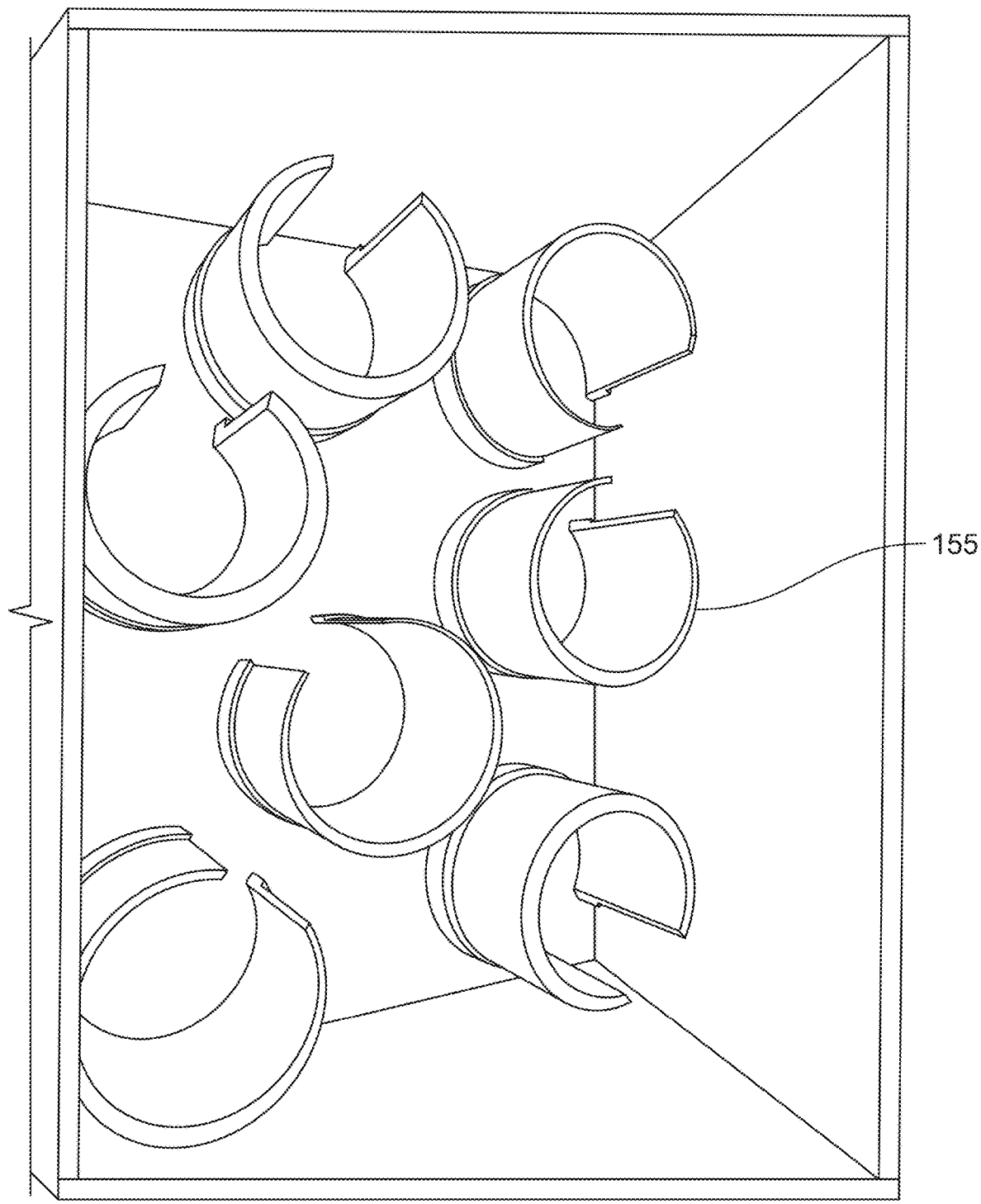
FIG. 9 shows exemplary spacers according to an embodiment of the present disclosure.

In some embodiments, the housing 110 of the camera mount system 100 is structured to receive and hold the camera 160 and the scope 170. In some embodiments, one or both of the camera 160 and the scope 170 can be integrated into the camera mount system 100 into a single device. Referring to FIG. 2, a first end 123 of the housing 110 of the camera mount system 100 is structured to receive the scope 170. One or more clamps 127 can be used to tighten, via screws, for example, the housing 110 of the camera mount system 100 around the scope 170. Different sized spacers 155 as shown in FIG. 9 can be inserted into the first end 123 of the camera mount system 100 according to some embodiments to receive different sized scopes and to assist in centering the scope with the optical axis of the camera mount system 100. A second end 133 of the housing 110 of the camera mount system 100 is structured to receive the camera 160. One or more clamps 137 can be used to tighten, via screws, for example, the housing 110 of the camera mount system 100 around the camera 160. In some embodiments, different sized spacers 155 can be inserted into the second end 133 of the camera mount system 100 to receive different sized cameras and to assist in centering the camera 160 with the optical axis of the camera mount system 100 and/or to align with the optical axis of the scope 170.

The ends 123, 133 of the housing 110 can be structured to receive, hold, and/or mount the camera 160 and/or the scope 170. Some mounting options include, for example, a strap, a Velcro strap, a hook-and-look fastener strap, a rubber adjustable strap, a clamp, a two piece clam style clamp, a connection, a quick detach cam connection, a collapsing collet system including multiple collet sizes and/or a pressure cap separate piece, a sleeve, a slip on sleeve with locking screws, different sized spacers to effectively change a scope diameter or a camera diameter to fit the housing 110 of the camera mount system 100, two bolt clamps with spacers, and/or other mounting elements. Although shown as circular, the ends 123, 133 can take on different shapes and sizes according to some embodiments.

Figure 3:
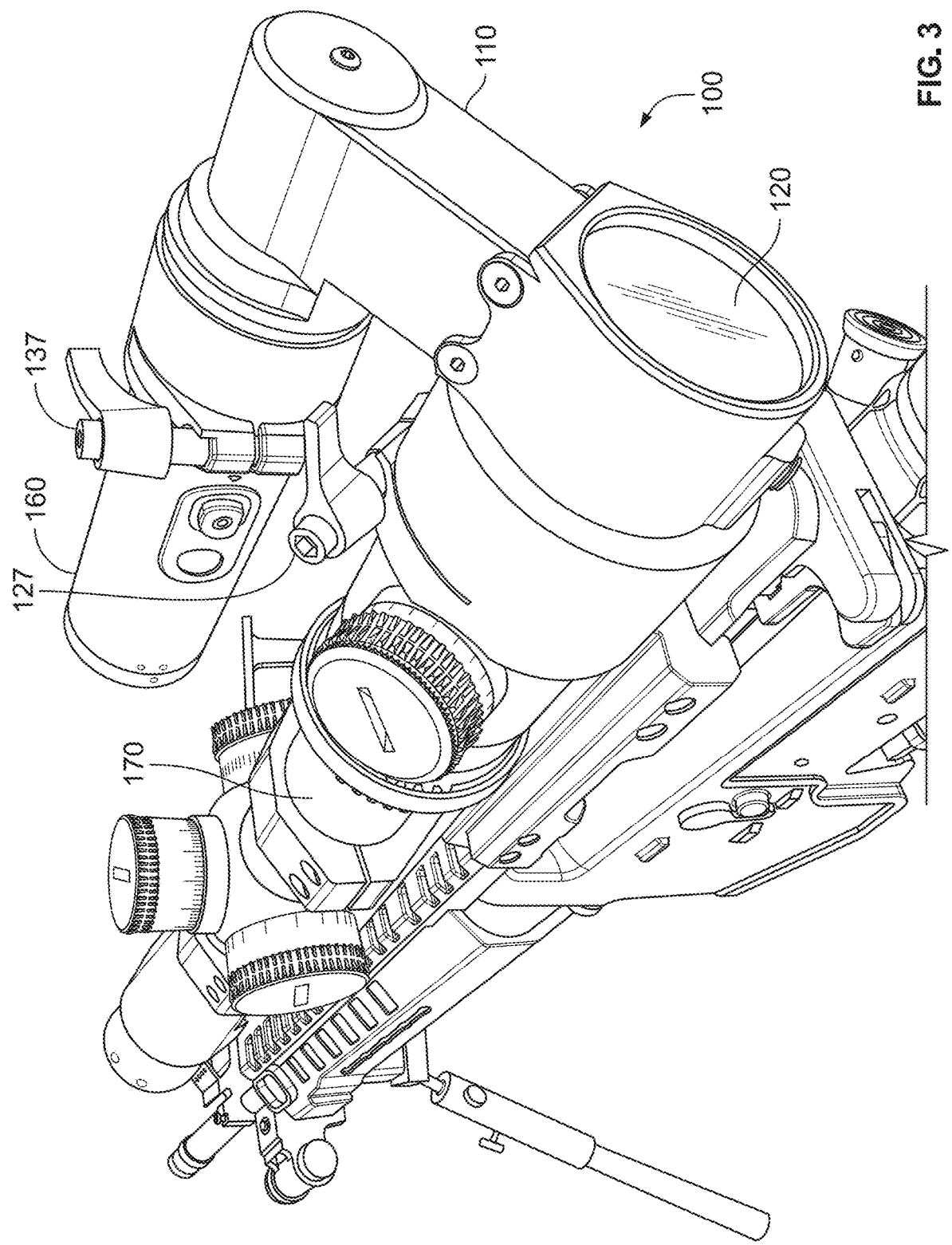
FIG. 3 shows a first view of an exemplary camera mount system mounted on a weapon according to an embodiment of the present disclosure.
Figure 4:
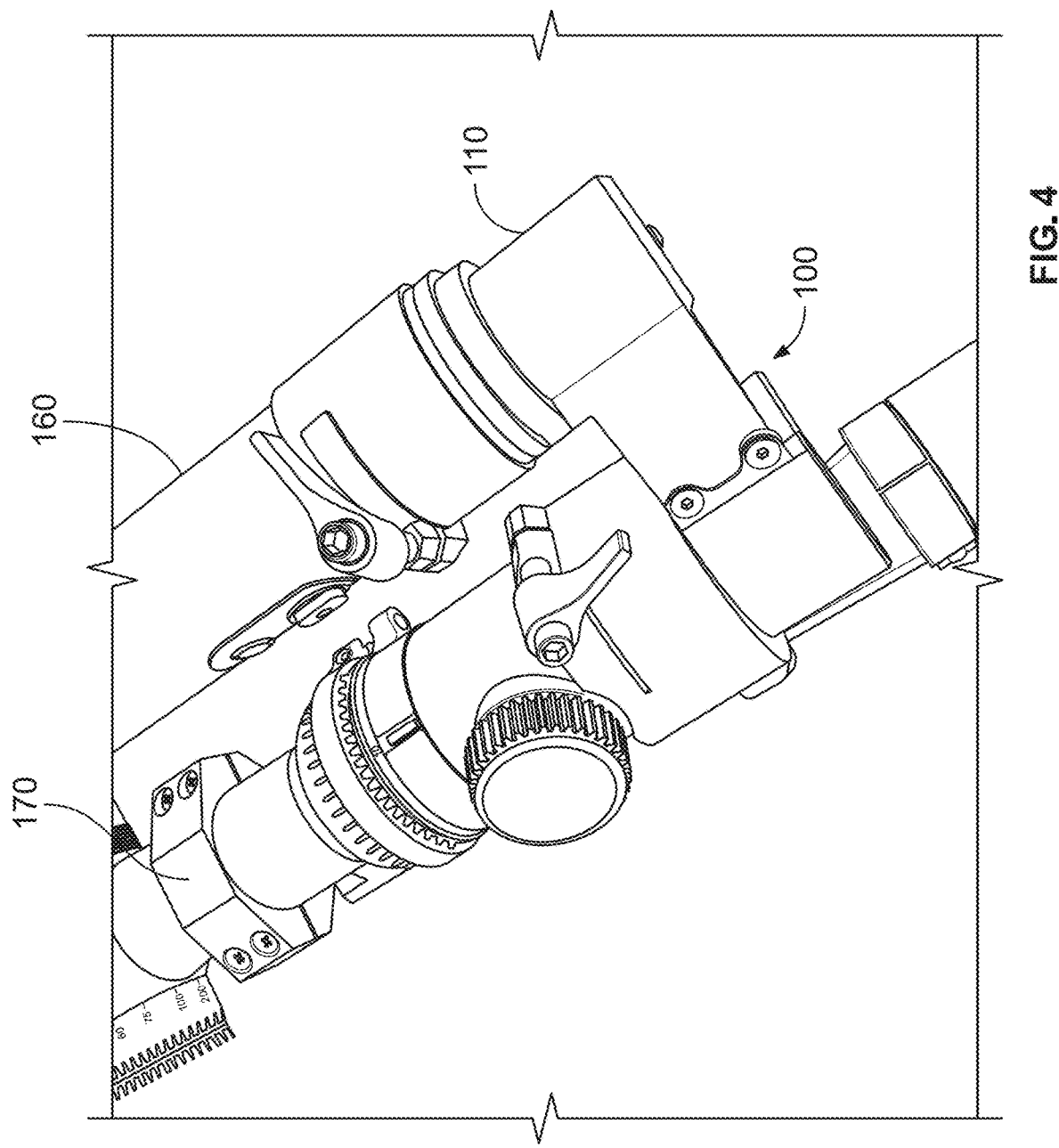
FIG. 4 shows a second view of the exemplary camera mount system of FIG. 3.

FIGS. 3 and 4 show different views of an exemplary embodiment of the camera mount system mounted on a weapon according to the present disclosure. Referring to FIGS. 3 and 4, the camera mount system 100 is physically secured, via a clamp 137, to the camera 160. The camera mount system 100 is also secured, via a clamp 127 to the scope 170. In some embodiments, the scope 170 can be mounted on the weapon via the mount 180. In some embodiments, the camera mount system 100 can be mounted on the weapon via the mount 150. In some embodiments, the camera mount system 100 can be mounted on the weapon via scope 170 which is mounted on the weapon.

Figure 5:
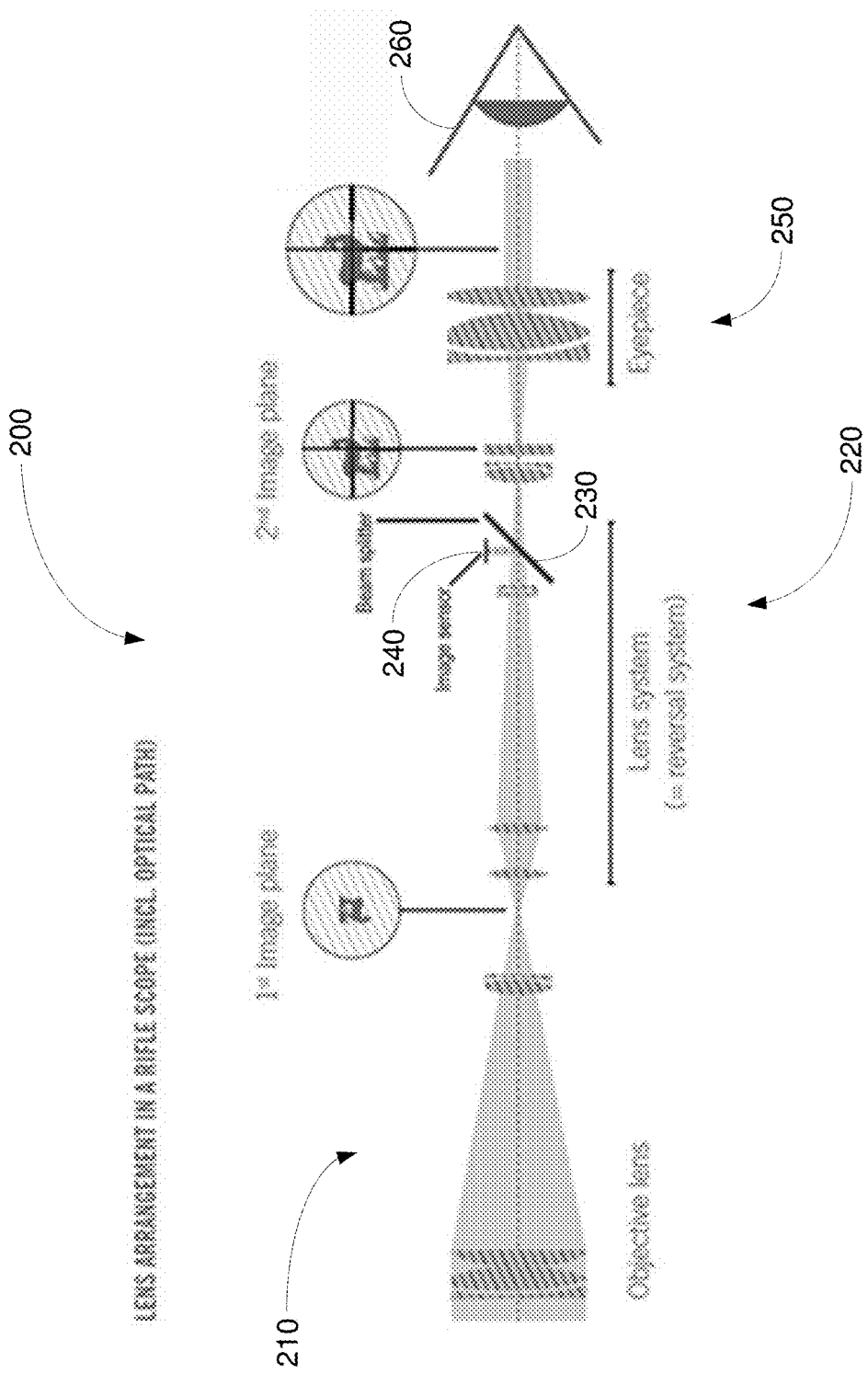
FIG. 5 shows an exemplary scope according to an embodiment of the present disclosure.

FIG. 5 shows an exemplary embodiment of a scope according to the present disclosure. Referring to FIG. 5, the scope 200 includes an objective lens system 210, a lens reversal system 220, a beam splitter 230, an image sensor 240 (e.g., one or more image sensors), and an eyepiece 250. Thus, the scope 200 and/or scope housing includes at least some of the features and/or elements of the camera 160 and/or the camera mount system 100. In some embodiments, the beam splitter 230 and the image sensor 240 can be positioned and/or re-positioned to different positions along the scope optical axis. In some embodiments, the beam splitter 230 and/or the image sensor 240 can be adjusted in position along the scope optical axis. In some embodiments, the beam splitter 230 and/or the image sensor 240 can be aligned with high precision as described herein.

In operation, light forming an image enters via the objective lens system 210 of the scope 200. As shown, the image is upside down after passing through the objective lens system 210. The image is turned right side up (or reversed) after passing through the lens reversal system 220. The lens reversal system 220 can also magnify the image. The image is then sent through the eyepiece 250 where the image is seen by the user's eye 260.

In the lens reversal system 220, the beam splitter 230 is disposed in the light path of the image, thereby splitting the image in two by partially reflecting the image in a first direction and by partially transmitting the image in the second direction. The second direction is the path to the eyepiece 250. However, the first direction, which may or may not be substantially perpendicular to the second direction, is the path to the image sensor which is used to capture images (e.g., pictures, video, etc.).

Although illustrated as in the lens reversal system 220, some embodiments provide that the beam splitter 230 is disposed elsewhere along the optical path within the scope 200.

Further, the scope 200 shown in FIG. 5 has many of the advantages and/or features that the camera mount system 100 in FIGS. 1-4 have. For example, the user is able to record the view through the scope while the user is looking through the scope optic. The image sensor 240 and the user both have the same view through the scope optic. In addition, there is no need for a digital screen, since the user is able to look directly through the scope optic, thereby overcoming the associated difficulties of such digital screens such as eye strain and locating and tracking moving targets. Finally, even if the battery that operates the image sensor runs out of energy, the user can still continue to use the scope.

Figure 6:
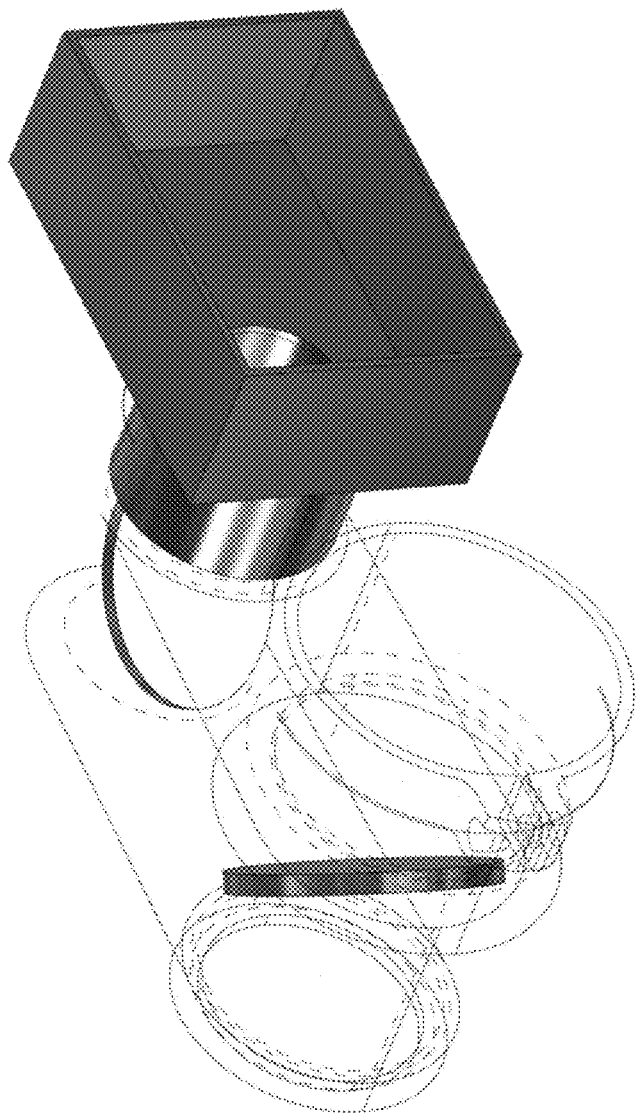
FIG. 6 shows a particular view of an embodiment of the camera mount system according to the present disclosure.
Figure 7:
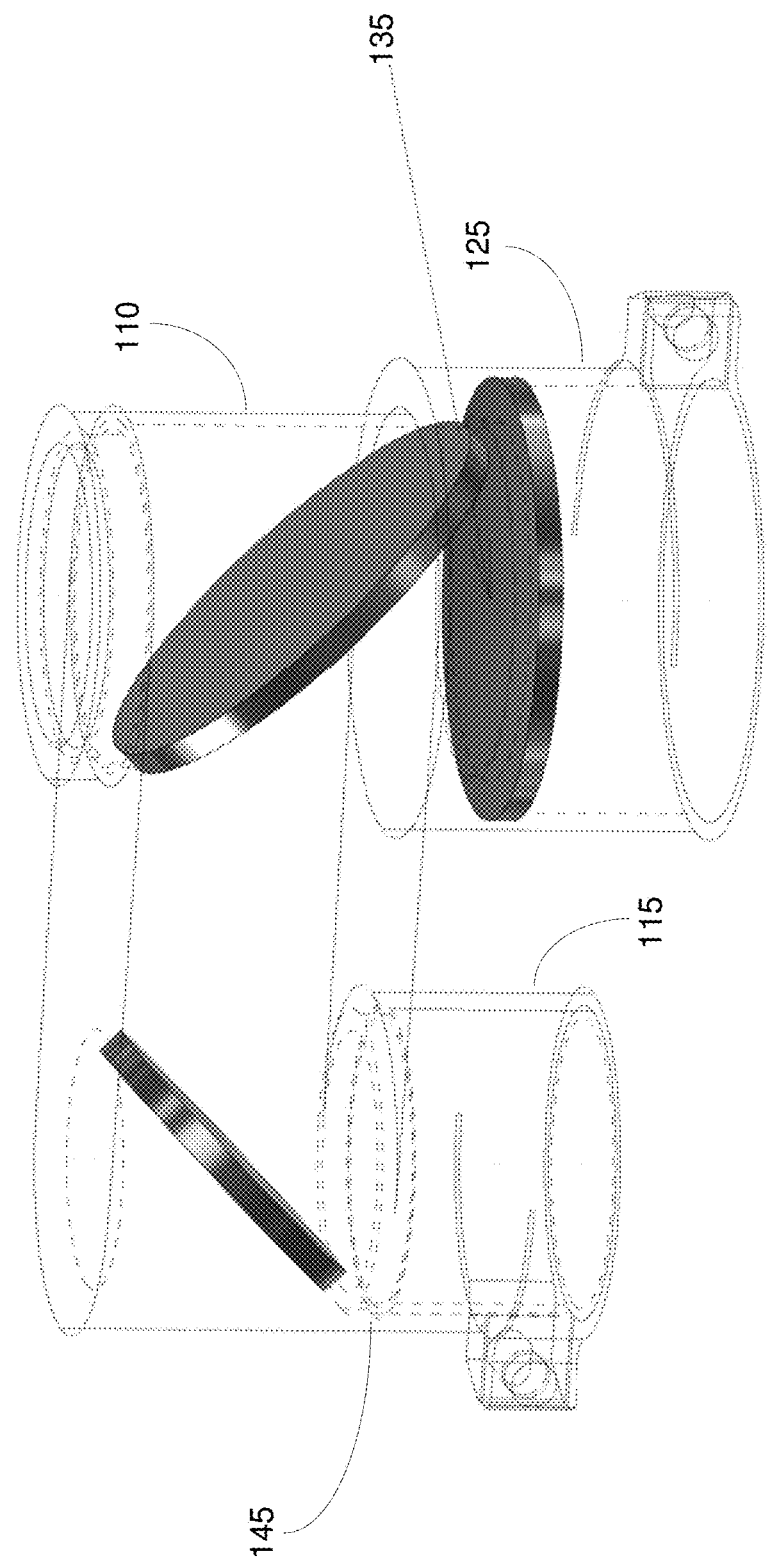
FIG. 7 shows a particular view of an embodiment of the camera mount system according to the present disclosure.
Figure 8:
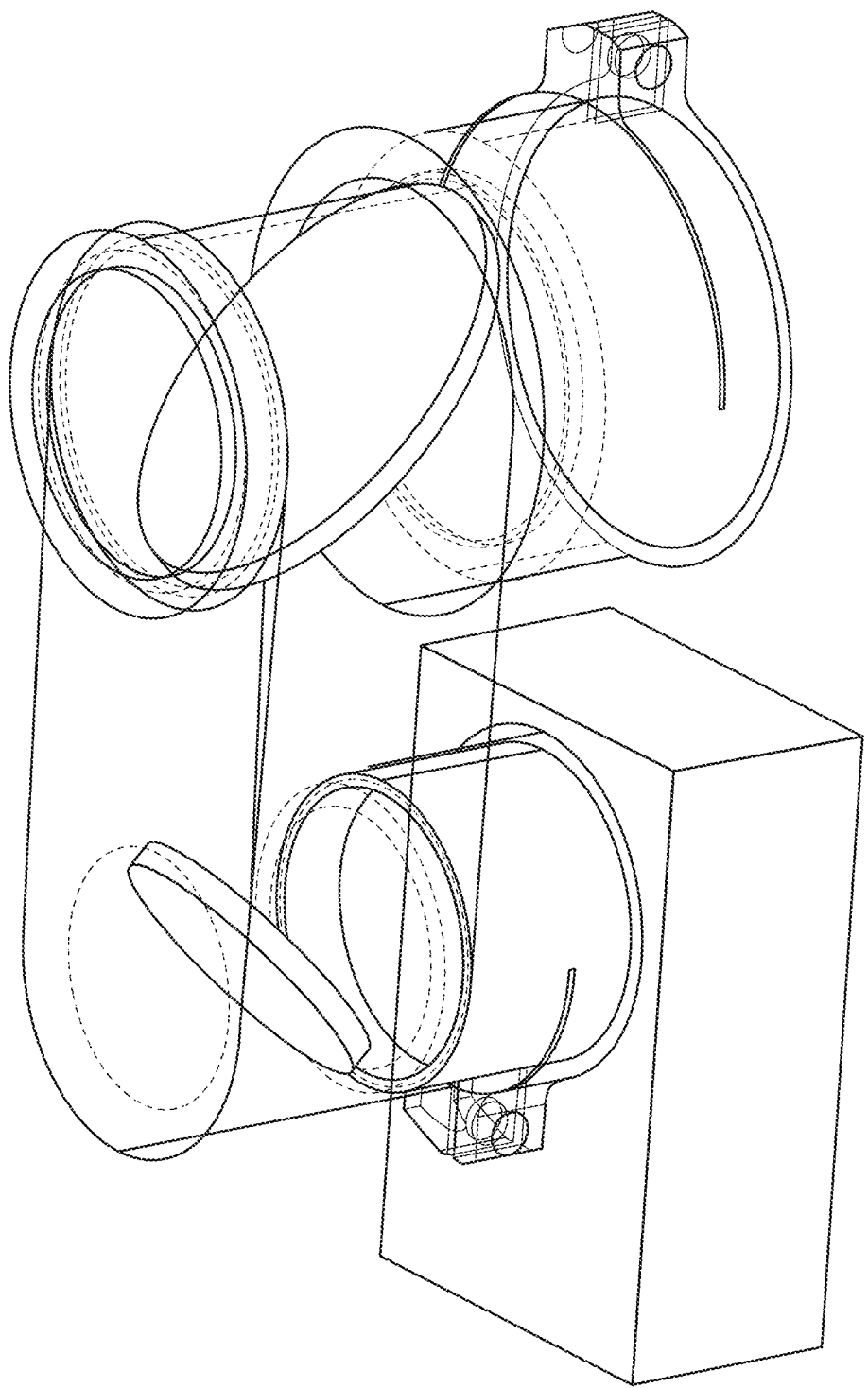
FIG. 8 shows a particular view of an embodiment of the camera mount system according to the present disclosure.

FIGS. 6-8 show different views and aspects of an embodiment of the camera mount system according to the present disclosure. The housing 110 and optics of the camera mount system 100 can be adjusted, modified, and/or reconfigured to accommodate different types and shapes of camera systems and different types and shapes of scopes or other viewing devices.

In some embodiments, the housing 110 can be custom-designed to accommodate a specific camera (or other recording device or image sensor) and/or a specific scope (or other viewing device). In some embodiments, the housing 110 can include a camera adapter 115 (e.g., a universal camera attachment mechanism) that can be attached to or is part of the housing 110 (e.g., a standard housing, an existing housing, etc.) to accommodate a specific camera or other type of recording device. In some embodiments, the housing 110 can include a scope adapter 125 that can be attached to or is part of the housing (e.g., a standard housing, an existing housing, etc.) to accommodate a specific scope or other type of viewing device. The adapters 115, 125 can be of different diameters and lengths to accommodate different devices, and can be interchangeable.

In some embodiments, interchangeable spacers 155 (e.g., hollowed cylinder-type structures that fit inside the adapter 115, 125 and receive an end of the scope, for example) of different lengths, thicknesses, and diameters can be inserted into the adapters 115, 125 to further accommodate different models, objective sizes, eyepieces, etc. of different scopes or viewing devices. FIG. 9 shows embodiments of seven spacers 155. The spacers 155 can have different thickness and different sized slots to accommodate different diameters of different scopes, for example. The slots provide flexibility and diameter tolerance, for example, when the spacers are secured by a clamp, for example, of the housing 110. Each spacer 155 is interchangeable and can be inserted into the end of the corresponding adapter 115, 125. The spacers 155 can also be integrated with the adapters 115, 125 so that the adapters are interchangeable instead of the spacers 155. In some embodiments, adjustment for aligning the center of the scope optic with respect to the center of the camera view can be achieved by structuring the spacers as nonconcentric spacers 155. In some embodiments, the nonconcentric spacers 155 are made of nylon, but other materials can be used. The inside diameter of the nonconcentric spacer 155 that is inserted it the adapter 125, for example, does not share a common center point with the outside diameter of the nonconcentric spacer 155. Thus, by generally rotating the spacer around the longitudinal axis of the adapter 125, for example, the center of the scope optic can be adjusted with respect to the center of the camera view. In some embodiments, by generally rotating the spacer around the longitudinal axis of the adapter 125, for example, the spacer 155 changes the true position of the camera mount system on the scope's objective, thereby enabling centering of the video, for example, being recorded. In some embodiments, the cross hairs of the scope can be moved to the center of the camera view (e.g., video view, etc.) by rotating a nonconcentric spacer 155.

In some embodiments, the housing 110 can be structured to be used with different types of viewing devices that have different eye reliefs. For example, the eye relief is different if a rifle scope is attached to the housing 110 compared to binoculars or a spotting scope being attached to the housing 110. In some examples, adjustments take into account that the viewer's eyes are closer to the eyepiece for binoculars, for example, than the eyepiece for a rifle scope. To adjust for differences in eye relief, some embodiments provide that the housing 110 accommodates one or more lenses 135 that can be used to adapt the camera mount system 100 to change the eye relief when adapting to a different viewing device. For example, the housing 110 can employ one type of lens 135 (or no lens) for a particular rifle scope, a second type of lens 135 for a particular binocular, and a third type of lens 135 for a particular spotting scope. The housing 110 can also employ one type of lens 135 (or no lens) for one type of rifle scope and a different type of lens 135 for another type of rifle scope. Some embodiments also provide that the different lenses 135 can be easily removed and inserted (e.g., by dropping the lens 135 into the housing 110 and/or the scope adapter 125).

In some embodiments, the housing 110 can be structured to be used with different types of cameras, recording devices, and/or sensors. For example, the housing 110 can be structured to accommodate one or more lenses 145 to correct the focus, lens angle, angle of view, field of view, etc. In some embodiments, a particular lens 145 can be used for a particular camera, recording device, and/or sensor. For example, the housing 110 can employ one type of lens 145 (or no lens) for a particular camera, a second type of lens 145 for a particular recording device, and a third type of lens 145 for a particular sensor array. The housing 110 can also employ one type of lens 145 (or no lens) for one type of camera and a different type of lens 145 for another type of camera. Some embodiments also provide that the different lenses 145 can be easily removed and inserted (e.g., by dropping the lens 135 into the housing 110 and/or the camera adapter 115). Some embodiments provide that the recording of images or video can be optimized when the camera is also at the proper distance or eye relief. The distances and/or optical distances can be changed by inserting one or more lenses 145 to improve viewing by the camera, for example.

Figure 10:
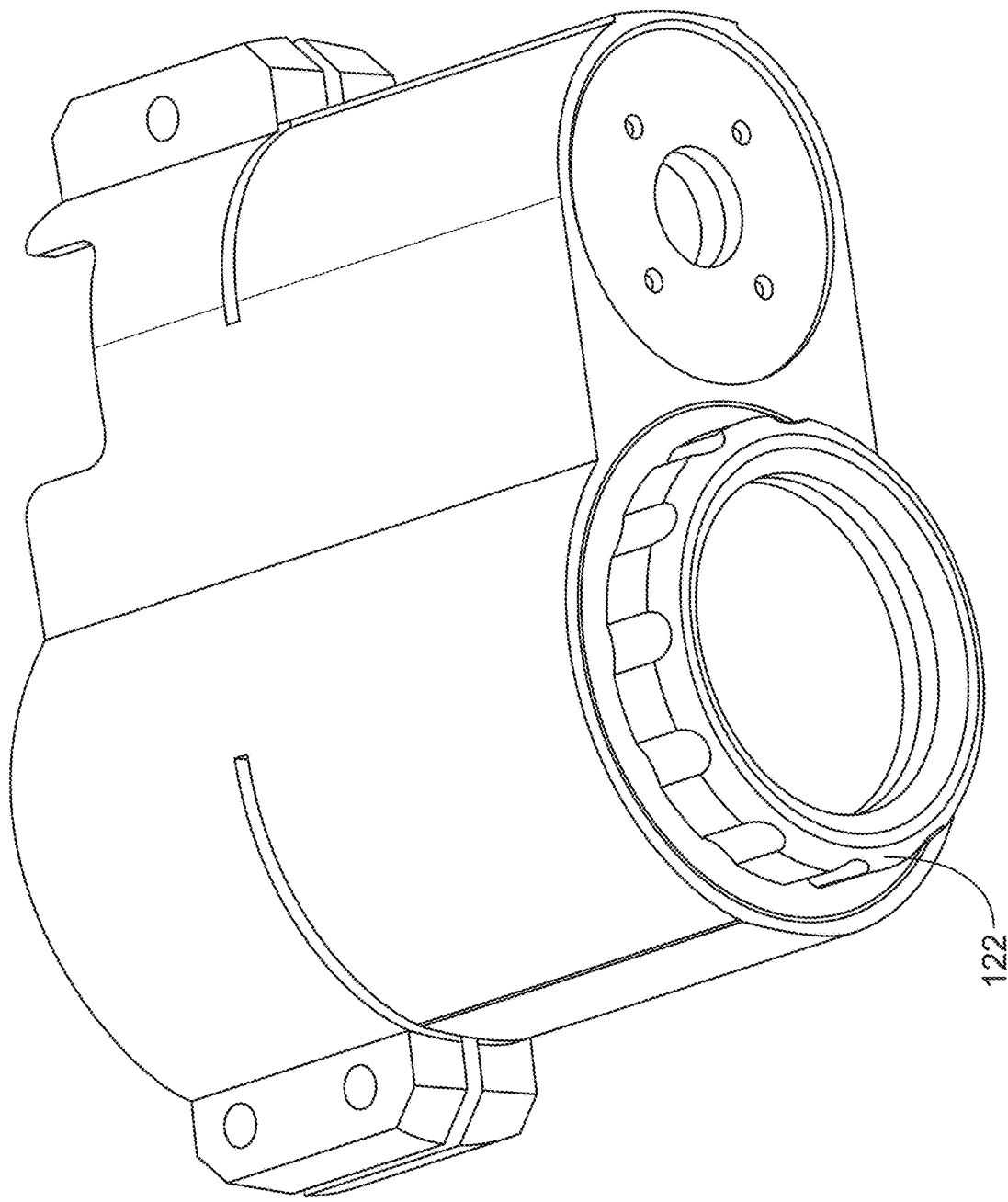
FIG. 10 shows a first view of an embodiment of the camera mount system according to the present disclosure.
Figure 11:
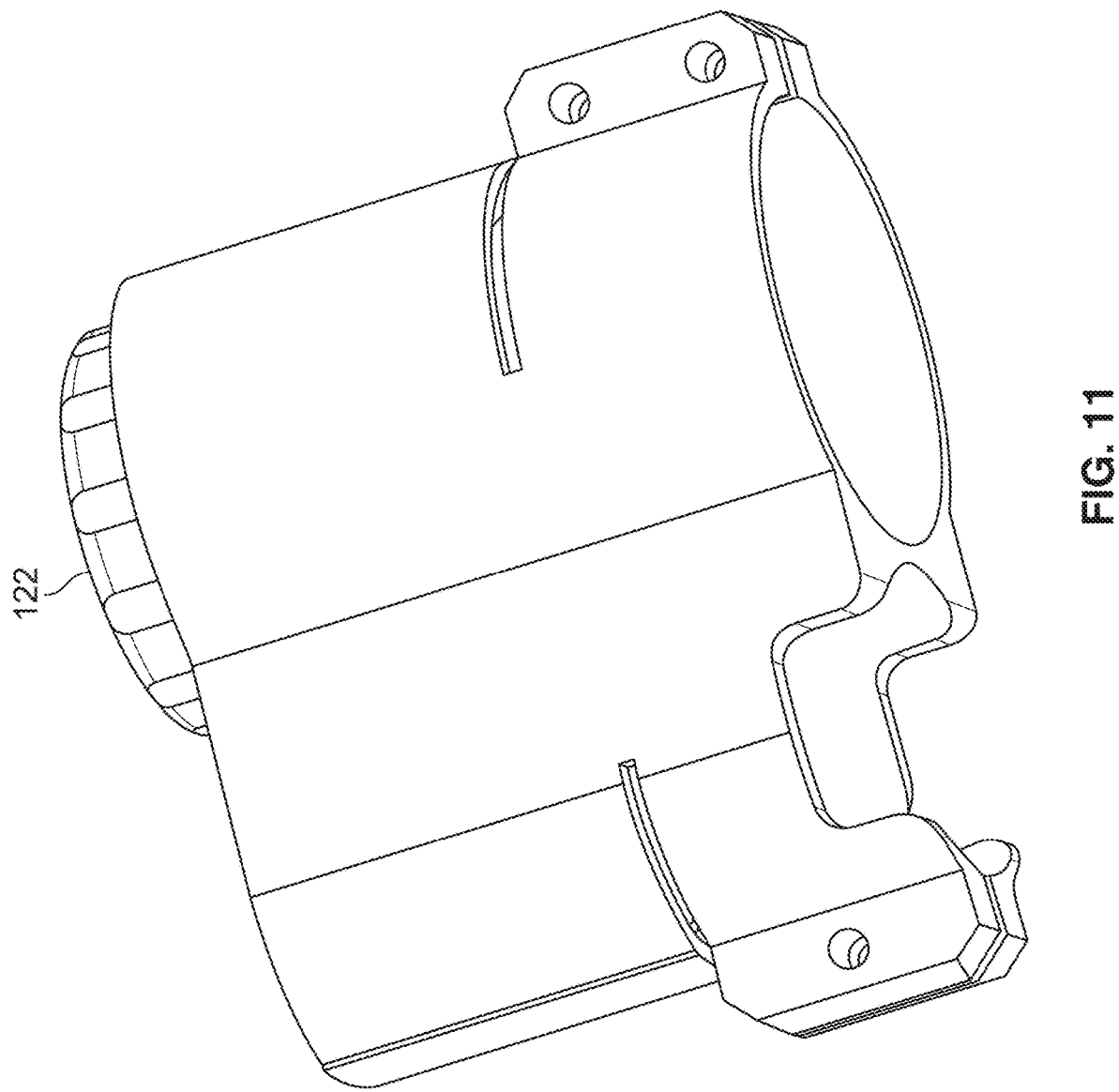
FIG. 11 shows a second view of an embodiment of the camera mount system according to the present disclosure.
Figure 12:
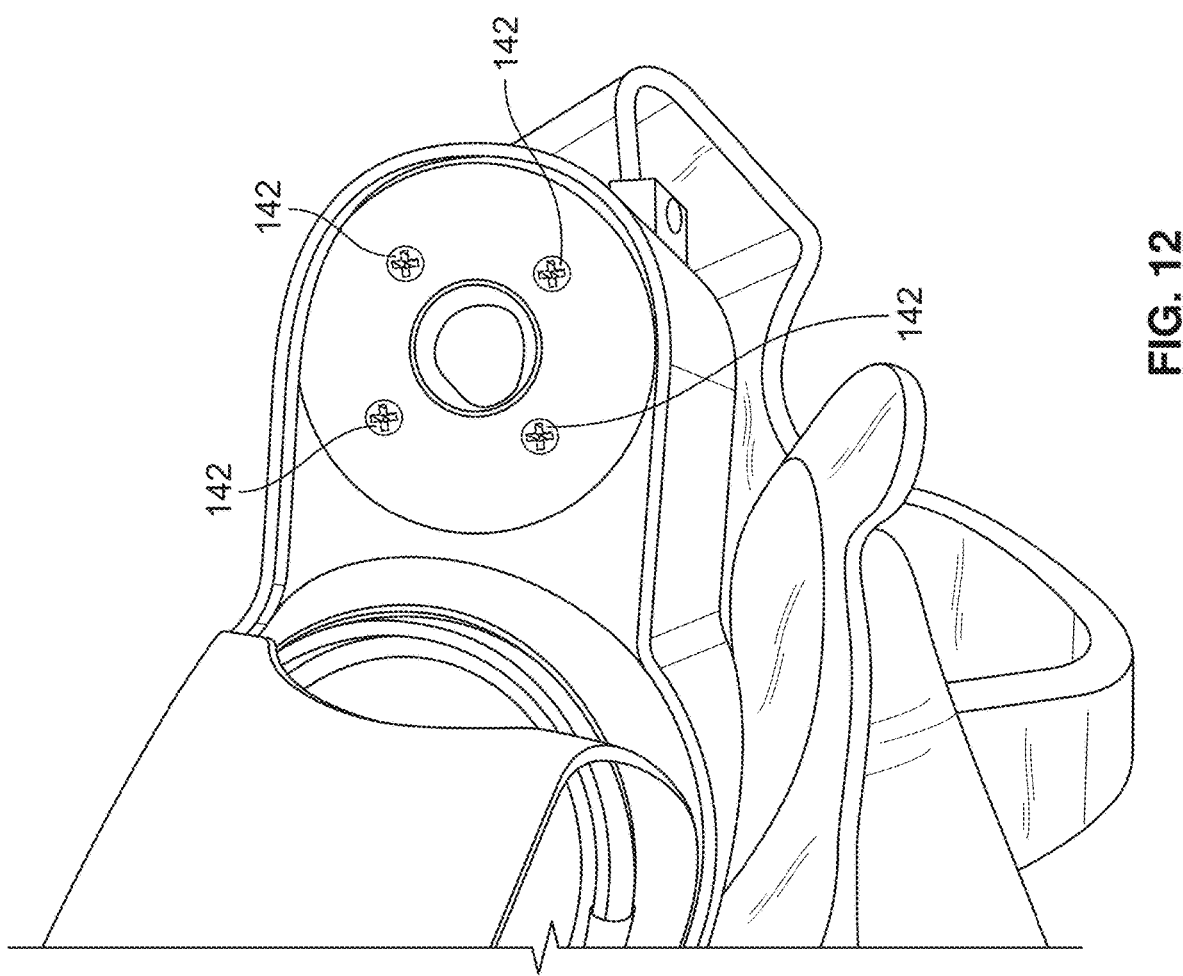
FIG. 12 shows exemplary adjustment mechanisms according to an embodiment of the camera mount system of the present disclosure.

Although different types of cameras, video recorders, image recorders, sensors, etc. are contemplated to be used with some embodiments of the camera mount system according to the present disclosure, one or more embodiments contemplate using the camera that has a similar shape, size, and functionality as the camera disclosed in U.S. application Ser. No. 15/593,991, filed May 12, 2017, which is incorporated herein by reference in its entirety. FIGS. 10 and 11 show different views of an embodiment of camera mount system which might be used with a camera, recording device, sensor array, etc. that has a similar form factor as the camera disclosed in said U.S. application Ser. No. 15/593, 991. Some embodiments contemplate that the camera mount system shown in FIGS. 10 and 11 can be used with other types of cameras, recording devices, sensor arrays, etc. that have different form factors than the camera disclosed in said U.S. application Ser. No. 15/593,991. The housing 110 of the camera mount system 100 is also shown with an eyeguard or eyecup 122. The eyeguard or eyecup 122 can be made of latex, rubber, or another flexible material, for example, and protects the user from accidental contact with the housing 110 on high recoil weapons by providing a cushion. Further, the eyeguard or eyecup 122 reduces the amount of ambient light that can enter the housing 110 via the eyepiece 120. Such light leakage can be the source of undesirable glare that can reach the camera 160 and negatively affect the images or video captured by the camera 160.

Systems, apparatuses, and methods are described which provide a camera mount system. The camera mount system can include, for example, a first optical element and a second optical element. Incoming light from a scope on a weapon, for example, is partially transmitted and partially reflected by the first optical element. The partially transmitted light passes through an eyepiece to a viewer (e.g., a shooter). The partially reflected light is reflected by the second optical element and is recorded by a recording device (e.g., a camera, a video recorder, sensors, etc.). The viewer has direct access to the scope optics, and the recording device and the viewer have access to the same view through the scope optics.

Some embodiments of the camera mount system according to the present disclosure provide that the camera mount system is compatible with any scope and can be mounted, via a film-through-scope mount and/or a flip-to-side mount, for example, on any weapon or other type of platform.

Some embodiments according to the present disclosure provide that the scope provides the focusing, magnifying, and/or field-of-view adjustments, thereby allowing for a lightweight, compact design of the camera mount system and the camera.

Although some embodiments of the camera mount system are described in combination with a scope for use on a weapon, the present application is not so limited. For example, the camera mount system can be used with different optical systems and/or instruments. Some embodiments provide that the camera mount system is attached and/or integrated with a spotting scope, a telescope, binoculars, field glasses, etc. Some embodiments provide that the camera mount system is attached and/or integrated with an arrangement and/or system of lenses and/or mirrors in which the arrangement and/or system may or may not be portable or mobile.

Some embodiments of the camera mount system according to the present disclosure provide consistency whether the camera mount system is used or not. A shooter, for example, will look through the scope in the same way whether the camera mount system is present or not, or whether the camera mount system is in place or flipped to the side via a flip-to-side mount, for example. This results in the shooter being able to easily locate and track a moving target, for example. Further, there is no eye strain from the camera mount system unlike digital screens that prohibit the user from viewing through the optic of the scope. In addition, the camera mount system allows the user to record video or capture images from the same view as seen through the scope.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
a housing that houses one or more eye relief lenses, a first optical element, a second optical element, and an eyepiece,
wherein the one or more eye relief lenses adjust light received from a viewing device based on an eye relief of the viewing device and direct the light to the first optical element,
wherein light is partially reflected by the first optical element along a first path to the second optical element,
wherein the light is partially transmitted by the first optical element along a second path to the eyepiece, and
wherein the light reflected by the first optical element is reflected by the second optical element and then recorded by a recording device.

2. The system according to claim 1, wherein the light received by the first optical element has been conditioned by an optical scope.

3. The system according to claim 2, wherein the optical scope and the first optical element are optically aligned.

4. The system according to claim 2, wherein the conditioning performed by the optical scope comprises one or more of the following: magnify, adjust focus, and adjust field of view.

5. The system according to claim 1, wherein the housing is mounted on a flip-to-side mount or to a scope that is mounted on a flip-to-side mount.

6. The system according to claim 2, wherein the optical scope and the housing are each mounted on a weapon, or the housing is removably attached to the optical scope which is mounted on the weapon.

7. The system according to claim 6, wherein the eyepiece provides a view through an optic of the optical scope.

8. An apparatus comprising:
a first adapter, a second adapter, a first optical element, a second optical element, and an eyepiece;
wherein the first adapter is configured to be coupled to a recording device;
wherein the second adapter is configured to be coupled to a viewing device;
wherein the second adapter comprises one or more eye relief lenses;
wherein the one or more eye relief lenses are configured to adjust, based on an eye relief of the viewing device, light received from the viewing device when the viewing device is coupled to second adapter;
wherein the one or more eye relief lenses are further configured to direct the light to the first optical element;
wherein the first optical element is configured to direct the light along a first path to the second optical element and along a second path to the eyepiece, and
wherein the second optical element is configured to direct the light toward the second adapter and the recording device when coupled thereto.

9. The apparatus according to claim 8, wherein:
the second adapter is configured to be coupled to a rifle scope; and
the one or more eye relief lenses are configured to adjust light received from the rifle scope based on an eye relief for the rifle scope.

10. The apparatus according to claim 8, wherein:
the second adapter is configured to be coupled to a spotting scope; and
the one or more eye relief lenses are configured to adjust light received from the spotting scope based on an eye relief for the spotting scope.

11. The apparatus according to claim 8, wherein:
the second adapter is configured to be coupled to binoculars; and
the one or more eye relief lenses are configured to adjust light received from the binoculars based on an eye relief for the binoculars.

12. The apparatus according to claim 8, wherein the second adapter permits removing a lens of the one or more eye relief lenses to adjust for the eye relief of the viewing device.

13. The apparatus according to claim 8, wherein the second adapter permits adding a lens to the one or more eye relief lenses to adjust for the eye relief of the viewing device.

14. The apparatus according to claim 8, further comprising a mount configured to mount the apparatus to a weapon.

15. The apparatus according to claim 8, further comprising a flip-to-side mount configured to mount the apparatus to a weapon.

16. The apparatus according to claim 8, wherein the eyepiece provides a view through an optic of the viewing device when coupled to the second adapter.

* * * * *